Figure 1:
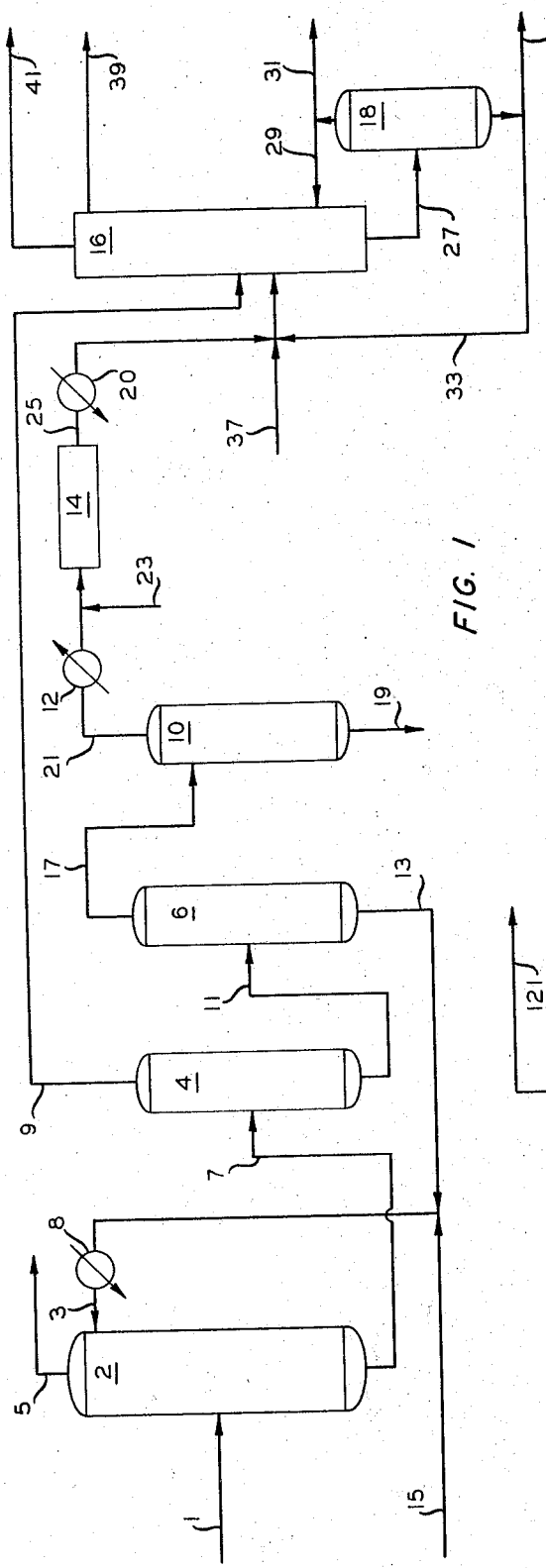

Dec. 20, 1966 H. A. CLAY 3,293,316
BUTADIENE PURIFICATION
Filed Dec. 31, 1964

INVENTOR
H. A. CLAY
BY
Young & Quigg
ATTORNEYS

United States Patent Office 3,293,316
Patented Dec. 20, 1966

3,293,316
BUTADIENE PURIFICATION
Harris A. Clay, Bartlesville, Okla., assignor to Phillips
Petroleum Company, a corporation of Delaware
Filed Dec. 31, 1964, Ser. No. 422,854
9 Claims. (Cl. 260—681.5)

This invention relates to the purification of butadiene.

In recent years the production of 1,3-butadiene has become increasingly important because of its use in the manufacture of synthetic rubber. Butadiene is prepared commercially by the dehydrogenation of butenes and from $C_4$'s produced in light olefin manufacture. The dehydrogenation products contain other hydrocarbons in addition to butadiene. Some of these additional hydrocarbons present in the butadiene adversely affect its subsequent use, particularly in the production of synthetic rubbers. Various methods and processes have been proposed for the segregation and purification of butadiene. Such methods and processes are generally designed for the complete removal of alkyl acetylenes, in particular vinyl acetylene, from the process streams. One such method comprises removing a side stream from a fractional distillation column whose purpose is the separating and recovering of the butadiene, and extractively distilling said side stream to remove a substantial portion of the acetylenes from the system and returning the hydrocarbons remaining back to the fractional distillation zone. Recently, certain catalysts have been found that will selectively hydrogenate alkyl acetylenes in a stream containing butadiene without appreciable loss of butadiene.

I have now found a method for recovering, free of acetylenes, substantially all of the butadiene in a stream containing butadiene and acetylenes, such as dehydrogenation effluents. In one embodiment, butadiene and acetylenes are absorbed in a selective solvent, such as furfural, the rich solvent is stripped twice to obtain a butadiene rich stream and a stream rich in acetylenes, the latter is passed over an acetylene-selective hydrogenation catalyst to remove the acetylenes by conversion thereof. The butadiene rich stream and the hydrogenation effluent are fractionated in the presence of a kerosine fraction to recover the butadiene free of acetylenes. In another embodiment, a stream containing butadiene and acetylenes is fractionated and a side stream rich in acetylenes is removed and passed over an acetylene-selective hydrogenation catalyst to remove the acetylenes by conversion thereof. The hydrogenation effluent is deoiled in the presence of a kerosine fraction and the $C_4$ components are returned for fractionation to recover the butadiene free of acetylenes.

Accordingly, it is an object of this invention to provide a method for the improved recovery of butadiene.

It is another object of this invention to provide a substantially pure butadiene stream free from acetylenes.

It is another object of this invention to provide a method for eliminating acetylenes from a butadiene stream containing same.

It is a still further object of this invention to provide apparatus suitable for improved recovery and purification of butadiene.

Other objects and advantages of this invention will be apparent to one skilled in the art upon further study of this disclosure, the drawing and the appended claims.

Figure 2:
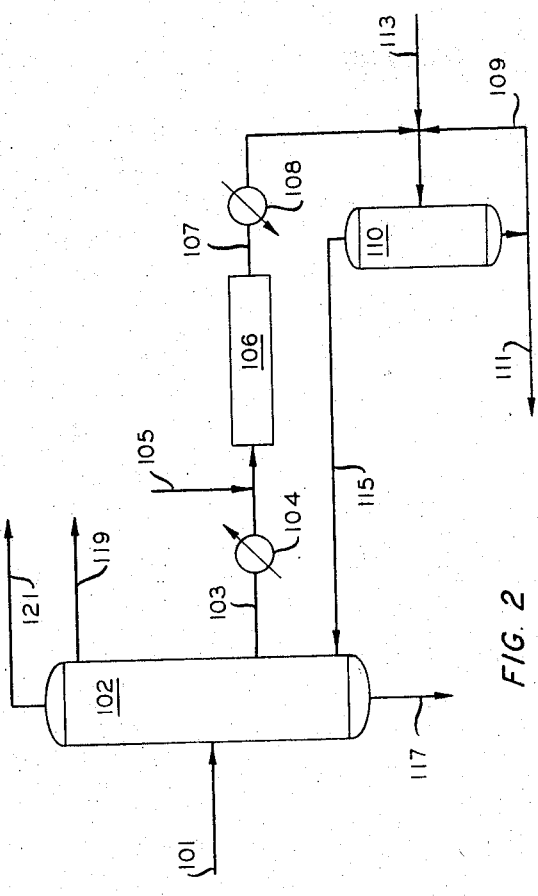

My invention will now be described in more detail with reference to the accompanying drawing in which FIGURE 1 is a schematic illustration of the butadiene purification system invention; and FIGURE 2 is another embodiment of the butadiene purification system invention.

Referring now to FIGURE 1 of the drawing, a butadiene-containing feed derived from the catalytic dehydrogenation of $C_4$ olefins is passed by conduit 1 to extractive distillation column 2. A solvent, selective for the butadiene and acetylene content of the feed stream, is introduced into extractive distillation zone 2 through conduit 3. The non-absorbed components, butene-1, normal butane, etc., are removed as overhead product from extractive distillation zone 2 through conduit 5. Rich solvent containing butadiene, alkyl acetylenes and other absorbed components from extractive distillation zone 2 passes through conduit 7 into a first stripping zone 4. A relatively highly concentrated butadiene stream is removed as overhead product from first stripping zone 4 through conduit 9. Solvent, still containing some butadiene and the acetylenes is removed from first stripping zone 4 through conduit 11 and introduced into second stripping zone 6. Lean solvent is removed from second stripping zone 6 through conduit 13, cooled by means 8 and introduced into conduit 3 for recycle to extractive distillation zone 2. Make-up solvent is introduced to conduit 13 through conduit 15, as needed. The overhead product from the second stripping zone 6 comprising a concentrated acetylenes-butadiene stream passes through conduit 17 into deoiler 10. The higher boiling components are removed from the desired hydrocarbons by deoiler 10 through conduit 19 and passed to further recovery equipment, not shown. The concentrated acetylenes-butadiene stream is removed from deoiler 10 through conduit 21, heated by means 12 and introduced into hydrogenation zone 14. Hydrogen is introduced to the concentrated acetylenes-butadiene stream prior to entry into hydrogenation zone 14 through conduit 23. The effluent from hydrogenation zone 14 is passed through conduit 25 and cooled in heat exchange means 20 and then introduced into fractionation zone 16. A kerosine fraction is introduced into the hydrogenation effluent in conduit 25 through conduit 37 thereby into fractionation zone 16. The concentrated butadiene stream removed from the first stripping zone 4 through conduit 9 is also introduced into fractionation zone 16. High boiling material from fractionation zone 16 is removed through conduit 27 and introduced into deoiler 18. Butene-2 is removed as overhead from deoiler 18 and a portion thereof is recycled to fractionation zone 16 through conduit 29. The remainder of the butene-2 is removed from the system through conduit 31. An oil stream is recovered from deoiler 18 and a portion thereof is recycled through conduit 33 to conduit 25 to be introduced into fractionation zone 16 with the effluent from hydrogenation zone 14. The remainder of this oil is removed from the system through conduit 35. Butadiene, substantially free of acetylenes, is recovered as overhead liquid product through conduit 39 from fractionation zone 16. Light components such as unreacted hydrogen are removed from zone 16 as overhead accumulator vapor through conduit 41.

Referring now to FIGURE 2, a feed material containing butadiene and acetylenes is introduced into fractionation zone 102 through conduit 101. In fractionation zone 102, during the separation of the feed stream, the acetylenes contained therein become concentrated in a certain region within the fractionation zone 102. From this zone a stream of concentrated acetylenes in butadiene and butenes is removed through conduit 103, heated by heat exchange means 104 and introduced into hydrogenation zone 106. Hydrogen is added to the concentrated acetylenes-C₄ hydrocarbon stream in conduit 103 through conduit 105 prior to entering hydrogenation zone 106. Effluent from hydrogenation zone 106 is passed through conduit 107, cooled by heat exchange means 108 and introduced into deoiler 110. An oil stream is removed from deoiler 110 and a portion thereof is recycled to deoiler 110 through conduit 109 into conduit 107. The remainder of this oil is removed from the system through conduit 111. A kerosine fraction is introduced with the hydrogenation zone effluent in conduit 107 entering deoiler 110 through conduit 113. The overhead from deoiler 110, comprising the products of the hydrogenation zone is recycled to the fractionation zone 102 through conduit 115. A butene-2 stream is removed from fractionation zone 102 through conduit 117. Butadiene, substantially free from acetylenes, is recovered as overhead liquid product through conduit 119 from distillation zone 102. Light components such as unreacted hydrogen are removed from zone 102 as overhead accumulator vapor through conduit 121.

The arrangement of deoiler 18 in FIGURE 1 may be used in the system of FIGURE 2 and likewise, the arrangement of deoiler 110 in FIGURE 2 may be used in the system of FIGURE 1.

Any catalyst selective for the hydrogenation of acetylenes in the presence of butadiene may be used in hydrogenation zones 14 and 106. A suitable metal-blend catalyst consists of about 99.9 to about 99.999 weight percent of finely divided copper with the balance being at least one finely divided metal of the group consisting of iron, nickel, ruthenium, rhodium, palladium, iridium and platinum. The metals at a concentration of from about 5 to 20 weight percent are dispersed on a high surface area carrier such as activated gamma or kappa alumina or combination thereof.

In practice, the desired selective hydrogenations are carried out by passing the indicated and equivalent feedstocks together with about 10 to 100 percent excess hydrogen (over the theoretic stoichiometric hydrogen requirement to convert the highly unsaturated hydrocarbons to olefinic hydrocarbons) over the catalysts of this invention at a space velocity between 400 and 600 hr.$^{-1}$ at a reaction temperature between 140° and 200° C. at a pressure between 1 and 10 atmospheres. Such a process is thoroughly described in U.S. Patent 3,076,858.

The kerosene fraction employed in the fractionation and deoiling operations serves as the carrier for removing the heavy components, known in the practice as "green oil," from the system.

The preceding material balance examples with reference to the accompanying drawings will further explain the particulars and advantages of this invention. However, such balances are not intended to limit the invention thereto.

Variations and modifications of this invention will be possible within the spirit and scope of the disclosure without departing from the invention.

What is claimed is:

1. A process for recovering butadiene from a hydrocarbon mixture containing butadiene, butene-1 and acetylenes comprising:

removing butene-1 as overhead in an extractive distillation zone by selectively absorbing butadiene and acetylenes from said mixture;

removing a concentrated butadiene stream from the rich solvent as overhead in a first stripping zone;

removing a concentrated acetylenes stream from the rich solvent as overhead in a second stripping zone;

selectively hydrogenating said concentrated acetylenes stream in a catalytic zone and recovering substantially pure butadiene as overhead in a separation zone from the effluent of said catalytic zone and concentrated butadiene stream.

2. A process for recovering butadiene from a hydrocarbon mixture containing butadiene, butene-1 and acetylenes comprising:

passing said mixture to an extractive distillation zone;

FIGURE 1 SYSTEM

| Component | Stream (mols per hour) | | | | | | | |
|---|---|---|---|---|---|---|---|---|
| | 1 | 5 | 9 | 21 | 41 | 39 | 31 | 35 |
| Hydrogen | | | | | 0.04 | | | |
| C³H⁶ and C³H⁸ | 0.61 | 0.61 | | | | | | |
| Methylacetylene | 0.01 | 0.01 | | | | | | |
| Isobutane | 0.20 | 0.20 | | | | | | |
| Isobutylene | 0.19 | 0.19 | | | | | | |
| 1-butene | 57.15 | 57.11 | 0.04 | | 0.01 | 0.03 | | |
| Butadiene | 36.62 | 0.11 | 34.51 | 2.00 | 0.04 | 36.38 | 0.07 | |
| n-Butane | 2.02 | 2.02 | | | | | | |
| trans-2-butene | 2.81 | 1.59 | 1.22 | | | 0.03 | 1.19 | |
| cis-2-butene | 0.35 | | 0.34 | 0.01 | | | 0.35 | |
| Vinylacetylene | 0.02 | | | 0.02 | | | | |
| Ethylacetylene | 0.02 | | | 0.02 | | | | |
| Kerosine | | | | | | | | ª 27 |
| Polymers | | | | | | | | ª 3 |
| Total | 100.00 | 61.84 | 36.11 | 2.05 | 0.09 | 36.44 | 1.61 | ª 30 |

ª Lbs./hour.

FIGURE 2 SYSTEM

| Component | Stream (mols per hour) | | | | | | |
|---|---|---|---|---|---|---|---|
| | 101 | 103 | 111 | 115 | 117 | 119 | 121 |
| Hydrogen | | | | | | | 0.04 |
| 1-butene | 0.04 | | | | | 0.03 | 0.01 |
| 1,3-butadiene | 36.51 | 0.062 | | 0.052 | 0.07 | 36.39 | 0.04 |
| trans-2-butene | 1.22 | 0.068 | | 0.068 | 1.19 | 0.03 | |
| cis-2-butene | 0.35 | 0.004 | | 0.004 | 0.35 | | |
| Vinylacetylene | 0.02 | 0.015 | | | 0.005 | | |
| Ethylacetylene | 0.02 | 0.002 | | | 0.018 | | |
| Kerosine | | | ª 11.7 | | | | |
| Polymers | | | ª 1.3 | | 0.005 | | |
| Total | 38.16 | 0.151 | ª 13.0 | 0.124 | 1.638 | 36.45 | 0.09 |

ª Lbs./hour.

passing a solvent selective for said butadiene and acetylenes to said extractive distillation zone;
removing unabsorbed butene-1 as overhead from said extractive distillation zone;
removing and passing the rich solvent from said extractive distillation zone to a first stripping zone;
removing a concentrated butadiene stream as overhead from said first stripping zone;
removing and passing the solvent from said first stripping zone to a second stripping zone;
removing and passing lean solvent as bottoms from said second stripping zone to said extractive distillation zone;
removing and passing a concentrated acetylenes stream as overhead from said second stripping zone to a deoiling zone;
heating the deoiled acetylenes stream;
introducing hydrogen to said acetylenes stream and passing the mixture to an acetylene selective catalytic hydrogenation zone;
cooling and passing the effluent from said hydrogenation zone to a fractionation zone;
passing said concentrated butadiene stream to said fractionation zone; and
recovering substantially pure butadiene as overhead from said fractionation zone.

3. The process of claim 2 further comprising:
deoiling the bottoms from said fractionation zone;
removing butene-2 as overhead from said deoiling step and recycling a portion thereof to said fractionation zone; and
removing green oil as bottoms from said deoiling step and recycling a portion thereof along with a kerosine hydrocarbon fraction to said hydrogenation zone effluent.

4. The process of claim 2 further comprising:
deoiling the effluent from said hydrogenation zone;
removing green oil at bottoms from said deoiling step and recycling a portion thereof along with a kerosine hydrocarbon fraction to said deoiling step; and
removing overhead from said deoiling step and recycling same to said fractionation zone.

5. The process of claim 2 wherein said solvent is furfural and said catalytic hydrogenation zone contains copper and a metal selected from the group comprising Fe, Ni, Ru, Rh, Pd, Ir and Pt on an alumina carrier.

6. A process for removing acetylenes from a butadiene containing stream comprising:
dividing said stream in a first separation zone;
removing a stream from said separation zone in which stream acetylenes are concentrated;
selectively hydrogenating said removed stream in a catalytic zone;
contacting the effluent from said catalytic zone with a liquid carrier in a second separation zone, separating carrier and heavy ends from lighter components in said second separation zone;
recycling the lighter components from said second separation zone to said separation zone; and
recovering substantially pure butadiene as overhead from said separation zone.

7. A process for removing acetylenes from a butadiene containing stream comprising:
passing said stream to a fractionation zone wherein separation thereof occurs;
removing and heating a side-stream from an intermediate region of said fractionation zone where the acetylenes are most concentrated;
introducing hydrogen to said side-stream and passing the mixture to an acetylenes selective catalytic hydrogenation zone;
contacting the effluent from said hydrogenation zone with a liquid carrier in a separation zone, separating carrier and heavy ends from lighter components in said separation zone, recycling lighter components concentrated in butadiene to said fractionation zone; and
recovering substantially pure butadiene as overhead from said fractionation zone.

8. The process of claim 7 further comprising:
removing green oil as said carrier and said heavy ends from said separation zone and recycling a portion thereof along with a kerosine hydrocarbon fraction to said contacting step; and
removing and passing the overhead from said separation zone to said fractionation zone.

9. The process of claim 7, wherein said catalytic hydrogenation zone contains copper and a metal selected from a group comprising Fe, Ni, Ru, Rh, Pd, Ir and Pt on an alumina carrier.

References Cited by the Examiner

UNITED STATES PATENTS

| 3,003,008 | 10/1961 | Fleming et al. | 260—681.5 |
| 3,013,952 | 12/1961 | Clay | 260—681.5 |
| 3,026,253 | 3/1962 | Woerner | 260—681.5 |
| 3,070,641 | 12/1962 | Herndon et al. | 260—681.5 |
| 3,076,858 | 2/1963 | Frevel et al. | 260—681.5 |

DELBERT E. GANTZ, *Primary Examiner.*

G. E. SCHMITKONS, *Assistant Examiner.*